(12) United States Patent
Serra et al.

(10) Patent No.: US 9,676,489 B2
(45) Date of Patent: Jun. 13, 2017

(54) AIRCRAFT ENGINE ATTACHMENT DEVICE, AND CORRESPONDING AIRCRAFT

(71) Applicant: Airbus Operations (SAS), Toulouse (FR)

(72) Inventors: Bruno Serra, Colomiers (FR); Richard Garrigues, Vigoulet-Auzil (FR)

(73) Assignee: Airbus Operations SAS, Toulouse (FR)

( * ) Notice: Subject to any disclaimer, the term of this patent is extended or adjusted under 35 U.S.C. 154(b) by 62 days.

(21) Appl. No.: 14/920,207

(22) Filed: Oct. 22, 2015

(65) Prior Publication Data
US 2016/0122029 A1 May 5, 2016

(30) Foreign Application Priority Data

Oct. 30, 2014 (FR) ..................................... 14 60416

(51) Int. Cl.
*B64D 27/26* (2006.01)

(52) U.S. Cl.
CPC ........ *B64D 27/26* (2013.01); *B64D 2027/262* (2013.01); *B64D 2027/264* (2013.01); *B64D 2027/266* (2013.01)

(58) Field of Classification Search
CPC .............. B64D 27/26; B64D 2027/264; B64D 2027/262; B64D 2027/266; F02C 7/20
See application file for complete search history.

(56) References Cited

U.S. PATENT DOCUMENTS

| 3,831,888 | A | 8/1974 | Baker et al. |
|---|---|---|---|
| 9,027,876 | B2 * | 5/2015 | Durand .................. B64D 27/26 244/54 |
| 2003/0068192 | A1 | 4/2003 | Schilling |
| 2005/0178888 | A1 | 8/2005 | Machado et al. |
| 2008/0156930 | A1 | 7/2008 | Audart-Noel et al. |

(Continued)

FOREIGN PATENT DOCUMENTS

| EP | 1302680 | 4/2003 |
|---|---|---|
| EP | 1535838 | 6/2005 |

(Continued)

OTHER PUBLICATIONS

French Search Report, Jun. 19, 2015.

*Primary Examiner* — Valentina Xavier
(74) *Attorney, Agent, or Firm* — Greer, Burns & Crain Ltd.

(57) ABSTRACT

A device for attaching an aircraft engine to a pylon secured to the aircraft, the attachment device comprising a beam secured to the pylon and a first clevis mount comprising two cheeks connected to one another by a first clevis pin. A second clevis mount is secured to the engine and comprises two cheeks connected to one another by a second clevis pin. A shackle is rotatably connected to the first and second pins by first and second spherical joints. The attachment device further comprises at least one pair of washers positioned around one of the pins, one washer on each side of the shackle, and separating the shackle from the cheeks of the clevis mount bearing the one of the pins. The shackle, in its extreme positions of rotation about the one of the pins passing through the two spherical joints, coming into contact with the washers.

8 Claims, 6 Drawing Sheets

(56) References Cited

U.S. PATENT DOCUMENTS

| | | | | |
|---|---|---|---|---|
| 2009/0032673 A1* | 2/2009 | Dron | ...................... | B64D 27/26 |
| | | | | 248/557 |
| 2009/0134270 A1* | 5/2009 | Renon | .................... | B64D 27/26 |
| | | | | 244/54 |
| 2012/0286126 A1* | 11/2012 | Gallet | ................... | F01D 25/162 |
| | | | | 248/554 |

FOREIGN PATENT DOCUMENTS

| EP | 1982915 | 10/2008 |
|---|---|---|
| FR | 2887853 | 1/2007 |

\* cited by examiner

AIRCRAFT ENGINE ATTACHMENT DEVICE, AND CORRESPONDING AIRCRAFT

CROSS-REFERENCES TO RELATED APPLICATIONS

This application claims the benefit of the French patent application No. 1460416 filed on Oct. 30, 2014, the entire disclosures of which are incorporated herein by way of reference.

FIELD OF THE INVENTION

The present invention relates to an aircraft engine attachment device. It also relates to an aircraft comprising such an attachment device.

BACKGROUND OF THE INVENTION

In many aircraft intended for carrying passengers, the aircraft engines are suspended from a pylon which is itself fixed to the underside of the aircraft wing structure.

Figure 1:
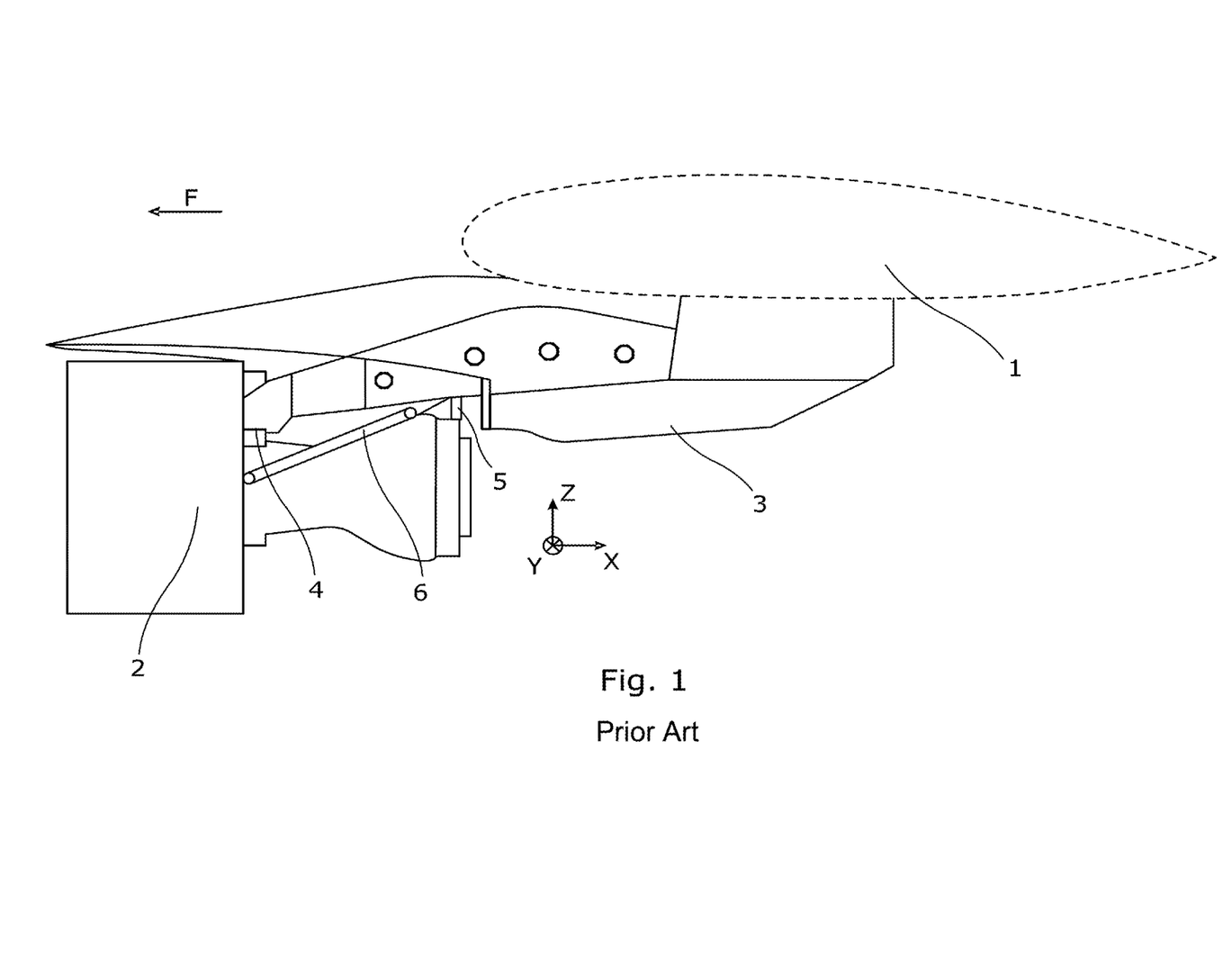
FIG. 1, already mentioned, schematically depicts the attachment of an aircraft engine under the aircraft wing structure according to the prior art.

FIG. 1 schematically depicts a connection between a wing 1 of an aircraft and an engine 2, consisting of a bypass turbojet engine. This connection is afforded by means of the pylon 3 which allows the loads generated by the engine 2 to be transmitted to the structure of the aircraft and also allows fuel pipes, electrical, hydraulic and air systems to be run between the engine 2 and the wing 1 of the aircraft.

In the description that follows, the front and the rear are defined relative to a direction of forward travel F of the aircraft. In addition, the direction of the axis of rotation of the engine 2 is referred to as the longitudinal direction X, the direction running at right angles to the longitudinal direction X, in a horizontal plane, is referred to as the transverse direction Y, and the direction running at right angles to the longitudinal direction X, in a substantially vertical plane, is referred to as the horizontal direction Z. These three directions X, Y and Z are mutually orthogonal.

The engine 2 is attached to the pylon 3 by an attachment device comprising a front suspension 4, a rear suspension 5 and load-reacting links 6. This attachment device supports, on the one hand, the weight of the engine 2 and, on the other hand, the significant loads generated by the engine 2, which are applied in different directions when the engine 2 is propelling the aircraft and when the aircraft 2, through a thrust-reversal system, is slowing the aircraft.

In the engine rear suspension 5, attachment of the engine 2 to the pylon 3 is, in some aircraft, notably performed using a shackle or link connected, via spherical joints, to two substantially parallel pins each one borne by clevis mounts, one of the pins being secured to the pylon 3 and the other being secured to the engine 2.

The engine 2 may shift slightly relative to the pylon 3 according to the loadings applied by this engine. The spherical joints that connect the shackle to the two pins allow this shifting without damaging the suspension 5. However, these spherical joints also allow the shackle to pivot about an axis passing through the center of the two spherical joints, into positions in which the edges of the shackle come into contact with the cheeks of the clevis mounts bearing the pins.

Such contact between components subjected to very substantial loadings and vibrations may cause premature wearing of the shackle and/or of the clevis mounts, potentially requiring them to be replaced at closely-spaced intervals. This replacement of components of course represents a significant cost to the operators of the aircraft.

SUMMARY OF THE INVENTION

It is an objective of the present invention to overcome this disadvantage of the prior art.

More specifically, one objective of the invention is to provide an aircraft engine attachment device for which maintenance operations are reduced.

One particular objective of the invention is to provide such an aircraft engine attachment device in which the wearing of the engine attachment components is reduced.

These objectives, together with others which will become more clearly apparent later on, are achieved by means of a device for attaching an aircraft engine to a pylon secured to the structure of the aircraft, the attachment device comprising:

a beam, able to be secured to the pylon and comprising a first clevis mount which comprises two cheeks connected to one another by a first clevis pin;
a second clevis mount, secured to the engine and comprising two cheeks connected to one another by a second clevis pin;
a shackle connected to the first pin by a first spherical joint and to the second pin by a second spherical joint;
the attachment device comprising at least one pair of washers which are positioned around one of the pins, one on each side of the shackle, and separating said shackle from the cheeks of the clevis mount bearing said pin, the shackle in its extreme positions of rotation about the pin passing through the two spherical joints coming into contact with the washers.

Introducing washers between the shackle and the cheeks makes it possible to avoid any contact and any friction between the cheeks and the shackle, thereby avoiding wearing of these components against one another.

For preference, the washers are made of a material of lower hardness than the material of which the shackle is made.

For preference, the washers have a circular external edge.

Advantageously, these washers near this external edge have a circular thickening.

The invention also relates to an aircraft comprising an engine fixed to a support pylon secured to the structure of the aircraft by an attachment device as described hereinabove.

BRIEF DESCRIPTION OF THE DRAWINGS

The invention will be better understood from reading the following description of one preferred embodiment given by way of nonlimiting illustrative example and accompanied by the figures in which.

DETAILED DESCRIPTION OF THE PREFERRED EMBODIMENTS

Figure 2:
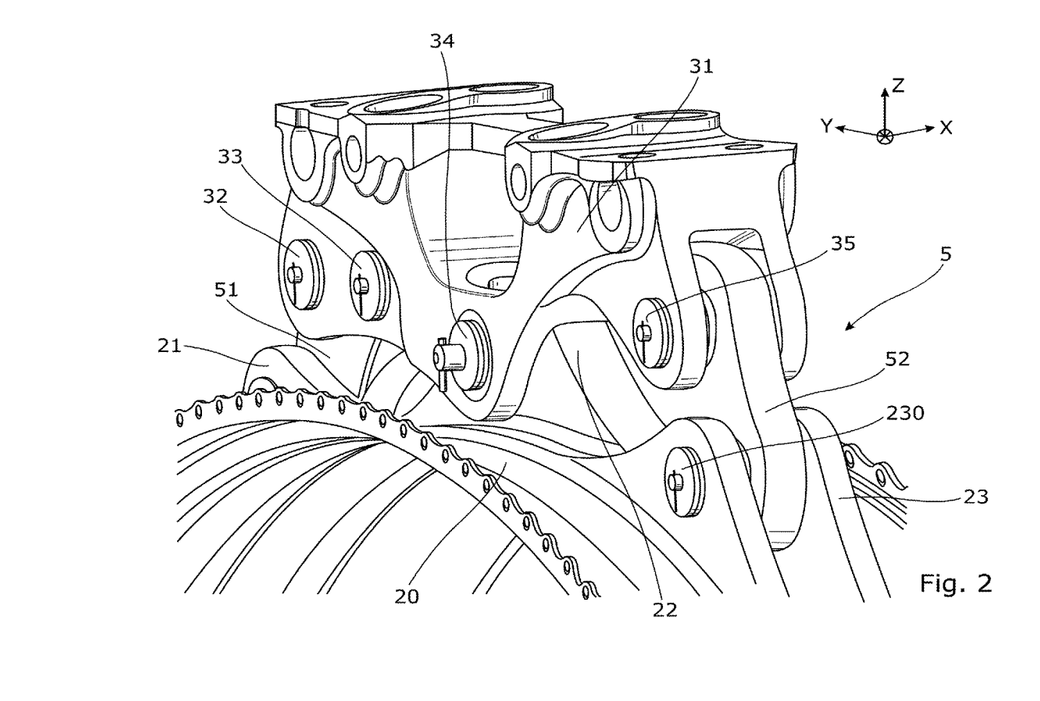
FIG. 2 is a perspective depiction of the rear suspension of an aircraft engine.
Figure 3:
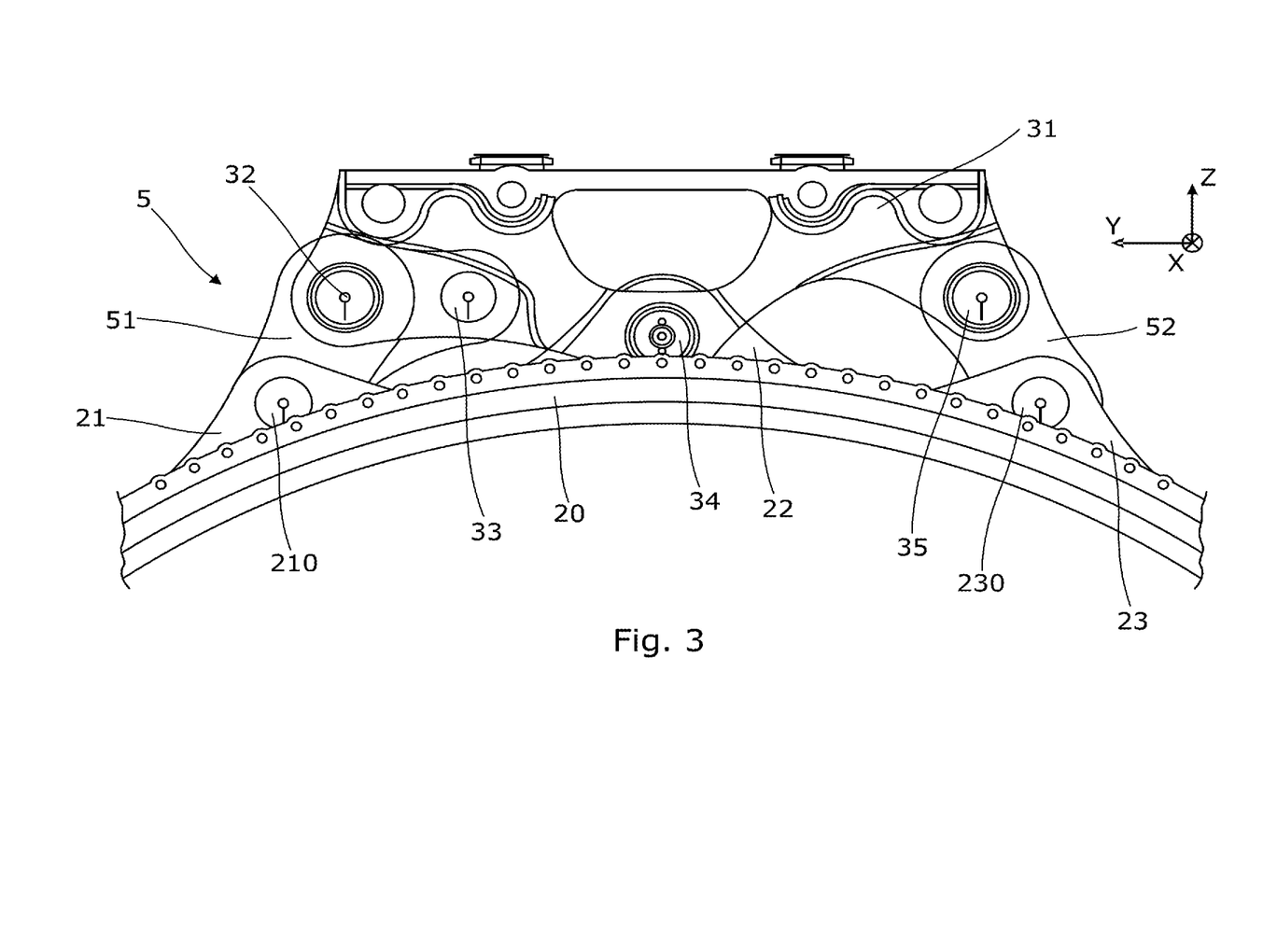
FIG. 3 is a front view of the rear suspension of FIG. 2.

FIGS. 2 and 3 depict the rear suspension 5 of an aircraft engine 2. This suspension 5 comprises a beam 31 that can be secured to a pylon 3 of the aircraft. This beam 31 comprises a number of clevis mounts, a clevis mount in the present description being made up of two substantially parallel cheeks bearing at least one clevis pin extending from one cheek to the other. More specifically, the beam 31 comprises a clevis mount 32 bearing the clevis pins 320 and 330, which are oriented in the longitudinal direction, a clevis mount 34 bearing a clevis pin 340 oriented in the longitudinal direction, and a clevis mount 35, also referred to in the present description as the "first clevis mount," which bears a clevis pin 350 oriented in the longitudinal direction.

The pin 350, borne by the first clevis mount 35, is connected to a pin 230, borne by a clevis mount 23 secured to the casing 20 of the engine 2. This clevis mount 23 is also referred to in the present description as the "second clevis mount." This connection is made using a shackle 52 or link, having two parallel holes for the passage of two pins 350 and 230.

The clevis pin 340 passes through a hole made in a central fixing lug 22 secured to the casing 20 of the engine 2. The two clevis pins 320 and 330 are connected to a clevis pin 210 borne by a clevis mount 21, which is itself secured to the casing 20 of the engine 2. This connection is made using a shackle 51 comprising three parallel holes allowing for the passage of the three clevis pins 320, 330 and 210.

Within the meaning of the present description, a shackle is a substantially flat component having several holes for joining together a number of substantially parallel pins passing through these holes. A shackle which, like the shackle 52, comprises two holes for connecting two parallel pins is equivalent to a link rod.

Figure 4A:
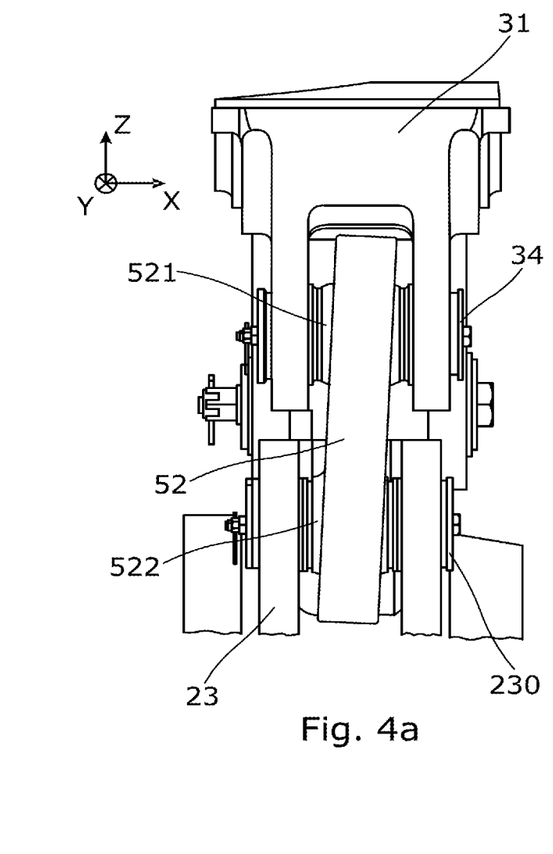
FIGS. 4a, 4b and 4c are side views of the suspension of FIG. 2 in three possible positions in the absence of washers according to one embodiment of the invention.
Figure 4B:
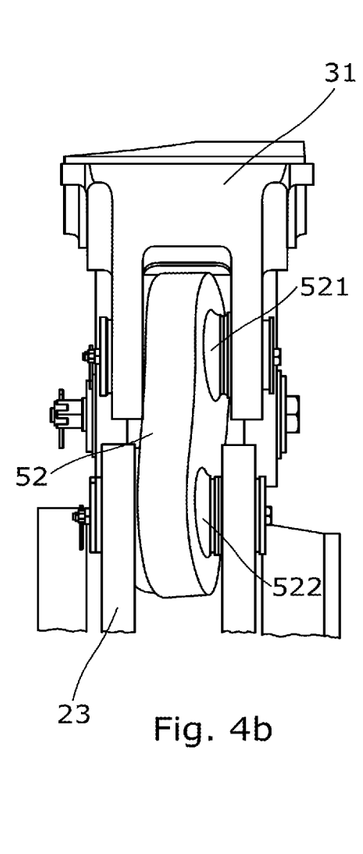
Figure 4C:
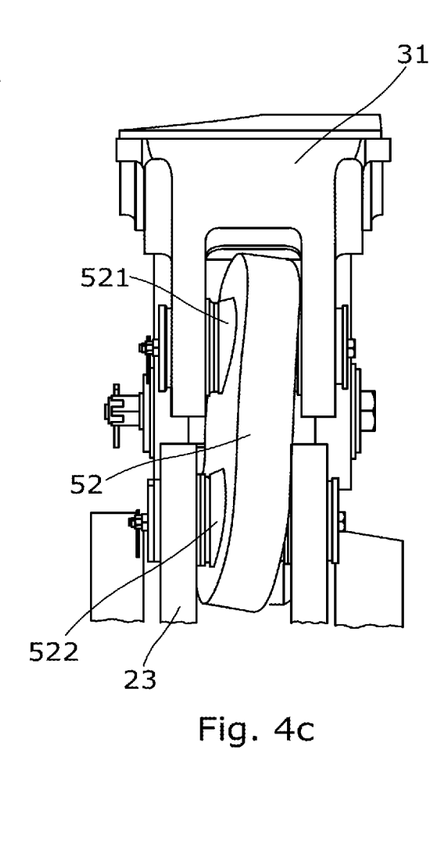

FIGS. 4a, 4b and 4c depict side views of the first clevis mount 35, secured to the beam 31, the second clevis mount 23, secured to the casing 20 of the engine 2, and the shackle 52. In the configuration depicted in these figures, the attachment device comprises no washers. Depending on the loads applied by the engine 2, the second clevis mount 23 connected to the engine 2 may shift slightly in relation to the first clevis mount 35 secured to the pylon 3. In order to allow such movements without damaging the engine suspensions, the shackle 52 is fixed to the pins 350 and 230 by spherical joints 521 and 522. These spherical joints 521 and 522 allow the shackle 52 to pivot with respect to its nominal position depicted in FIG. 4a, about an axis passing through the center of the two spherical joints, between extreme positions depicted in FIGS. 4b and 4c. In these extreme positions, the edges of the shackle 52 come into contact with the cheeks of the first clevis mount 35 or of the second clevis mount 23.

Figure 5:
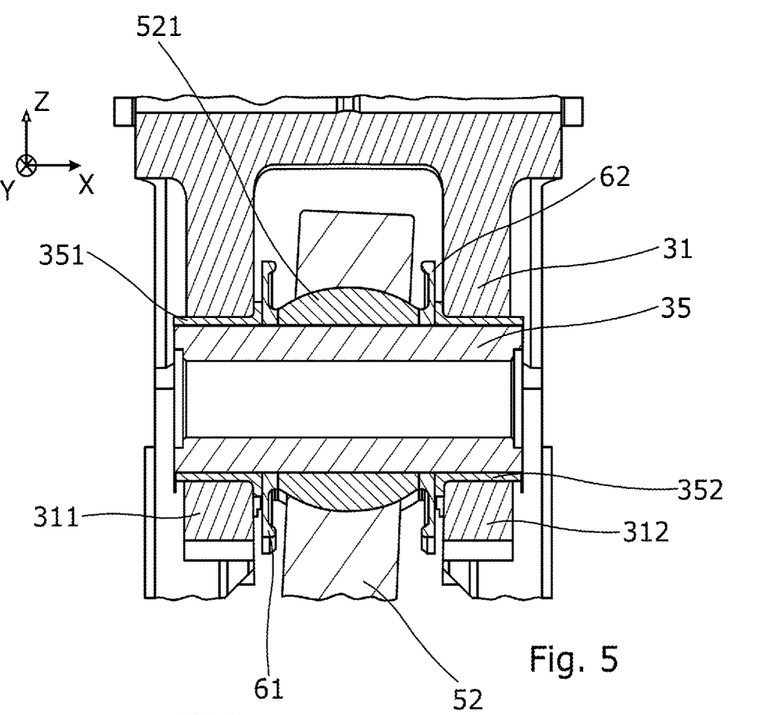
FIG. 5 is a view in section of the assembly of a shackle with a clevis mount in the rear suspension of FIG. 2, equipped with washers according to one embodiment of the invention.

To avoid premature wearing of the shackle 52 or of the cheeks of the first clevis mount 35 or of the second clevis mount 23, according to one embodiment of the invention provision is made for washers 61, 62 to be introduced into the attachment device as shown notably by FIG. 5. FIG. 5 thus depicts a view in cross section of the assembly of the shackle 52 with the first clevis mount 35.

Figure 6:
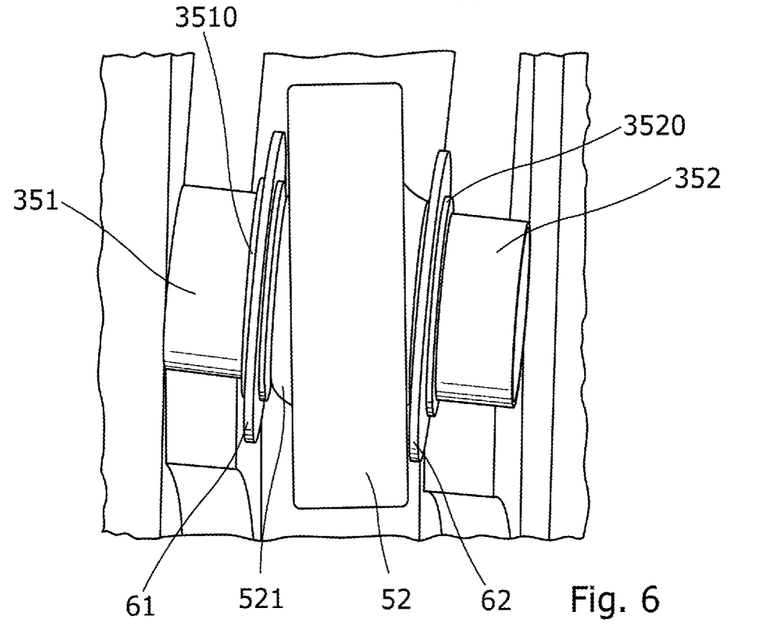
FIG. 6 depicts the shackle, the bushings and the washers used in the assembly of FIG. 5.

In order to prevent this shackle 52 from coming into contact with the cheeks 311 and 312 of the clevis mount 35 that bears the pin 350, provision is made for two washers 61 and 62 to be positioned on the pin 350 one on each side of the shackle 52, separating this shackle 52 from the cheeks 311 and 312 of the clevis mount 35. Thus, the washer 61 separates the cheek 311 from the shackle 52 and the washer 62 separates the cheek 312 from the shackle 52. As FIG. 6 shows, the presence of these washers limits the pivoting of the shackle 52 about the axis passing through the center of the spherical joints 521 and 522 and accordingly prevents contact between the shackle 52 and the cheeks 521 and 522 of the clevis mount 31.

Because the shackle 52 comes into contact with the washers 61 and 62, there may be some wearing between these components. For preference, the washers 61 and 62 are wearing components made of a less hard material than the shackle 52. They may for example be made of a metal such as copper or an alloy such as brass, when the shackle 52 is made of steel. In general, any material, notably metallic material that has a hardness (measured using conventional methods) that is lower than the hardness of the material of which the shackle is made can be used. Thus, contact between these components leads to wearing of the washers 61 and 62 without giving rise to significant wear of the shackle 52. Because the washers 61 and 62 have no mechanical function of securing the engine, the fact that they wear does not affect the safety of the attachment device and so long as they perform their role of providing separation between the shackle 52 and the cheeks 311 and 312 of the clevis mount 31, they need not be replaced.

The engine attachment device according to the invention thus makes it possible to reduce the number of maintenance operations performed on the rear suspension. In addition, when maintenance is carried out, only the washers 61 and 62 need be changed, these being inexpensive wearing components, without there being a need to change the clevis mount 35 or the shackle 52.

FIG. 5 shows how the washers 61 and 62 are mounted on the pin 350. As this figure shows, the pin 350 is mounted in the holes in the cheeks 311 and 312 of the clevis mount 35 via bushings or rings 351 and 352. Each of these rings 351 and 352 respectively comprises a cylindrical portion surrounding the pin 350 and a flange 3510 and 3520 respectively, which is intended to press against the internal face of the cheek 311 and 312 respectively of the clevis mount 35. When the engine attachment device is assembled, the washer 61 is introduced between the flange 3510 of the ring 351 and the spherical joint 521. Likewise, the washer 62 is introduced between the flange 3520 of the ring 352 and the spherical joint 521. The flanges 3510 and 3520 therefore separate the washers 61 and 62 from the cheeks 311 and 312.

Figure 7:
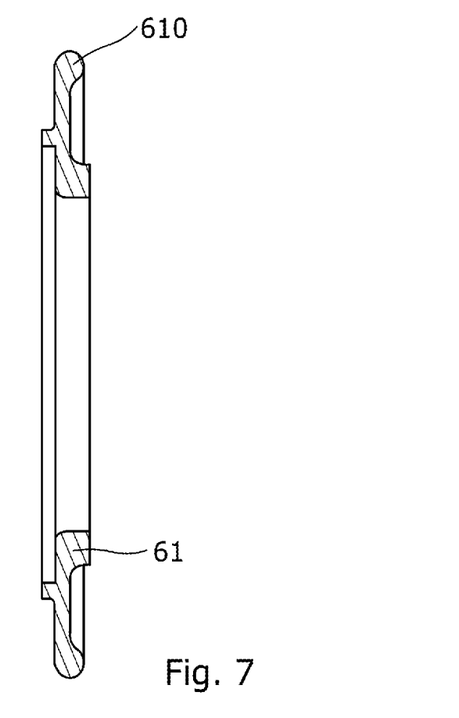
FIG. 7 is a view in cross section of a washer used in the assembly of FIG. 5.
Figure 8:
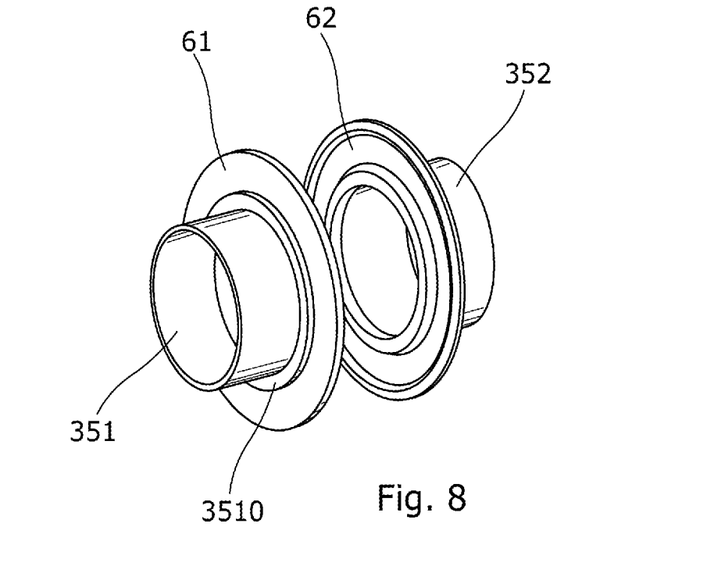
FIG. 8 depicts the bushings and the washers used in the assembly of FIG. 5.

FIG. 7 depicts the washer 61 viewed in cross section along its diameter. As this figure shows, the washer 61, near its external edge which is preferably circular has a circular peripheral thickening 610 which is intended to come into contact with the shackle 52 and be worn away by this shackle. The thickness of this thickening allows the washer 61 to tolerate significant wearing of its thickened portion 610 before it needs to be replaced.

The washer 61 is depicted in the shape of a disc. However, according to other embodiments that those skilled in the art may implement it is possible to employ washers of different shapes. Those skilled in the art will choose washers of shapes and sizes that will make it possible to avoid contact between the shackle and the cheeks of the clevis mount supporting the clevis pin fixed to the shackle.

Advantageously, similar washers may also be positioned around the second pin 230, on each side of the shackle 52, to prevent contact between this shackle and the cheeks of the clevis mount 23. More generally, it may be advantageous to use such washers at the connecting points of aircraft engine attachment shackles comprising two spherical joints with clevis pins supported by clevis mounts when the shackles have shapes likely to come into contact with the cheeks of one or other of the clevis mounts.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for attaching an aircraft engine to a pylon secured to the structure of the aircraft, the attachment device comprising:
    a beam, configured to be secured to the pylon and comprising a first clevis mount which comprises two cheeks connected to one another by a first clevis pin;
    a second clevis mount, configured to be secured to the engine and comprising two cheeks connected to one another by a second clevis pin;
    a shackle rotatably connected to the said first pin by a first spherical joint and to the second pin by a second spherical joint;
    at least one pair of washers positioned around one of the pins, one washer on each side of the shackle, and separating the shackle from the cheeks of the clevis mount bearing said one of the pins,
    the shackle, in its extreme positions of rotation about said one of the pins passing through one of the two spherical joints, comes into contact with the washers.

2. The attachment device according to claim 1, wherein the washers are made of a material of lesser hardness than the material of which the shackle is made.

3. The attachment device according to claim 1, wherein each of the washers has a circular external edge.

4. The attachment device according to claim 3, wherein each of the washers has a peripheral thickening near the external edge.

5. An aircraft comprising:
    an engine fixed to a support pylon secured to a structure of the aircraft by an attachment device, the attachment device comprising:
    a beam, configured to be secured to the pylon and comprising a first clevis mount which comprises two cheeks connected to one another by a first clevis pin;
    a second clevis mount, configured to be secured to the engine and comprising two cheeks connected to one another by a second clevis pin;
    a shackle rotatably connected to the said first pin by a first spherical joint and to the second pin by a second spherical joint;
    at least one pair of washers positioned around one of the pins, one washer on each side of the shackle, and separating the shackle from the cheeks of the clevis mount bearing said one of the pins,
    the shackle, in its extreme positions of rotation about said one of the pins passing through one of the two spherical joints, comes into contact with the washers.

6. The aircraft according to claim 5, wherein the washers are made of a material of lesser hardness than the material of which the shackle is made.

7. The aircraft according to claim 5, wherein each of the washers has a circular external edge.

8. The aircraft according to claim 7, wherein each of the washers has a peripheral thickening near the external edge.

* * * * *